(12) United States Patent
Pearce

(10) Patent No.: US 9,507,041 B2
(45) Date of Patent: Nov. 29, 2016

(54) SOLID STREAMER CONNECTOR APPARATUS AND METHOD OF USE THEREOF

(71) Applicant: Richard E. Pearce, Wetherford, TX (US)

(72) Inventor: Richard E. Pearce, Wetherford, TX (US)

( * ) Notice: Subject to any disclaimer, the term of this patent is extended or adjusted under 35 U.S.C. 154(b) by 759 days.

(21) Appl. No.: 13/855,129

(22) Filed: Apr. 2, 2013

(65) Prior Publication Data

US 2014/0293742 A1    Oct. 2, 2014

(51) Int. Cl.
*G01V 1/38* (2006.01)
*G01V 1/20* (2006.01)
*H01R 13/56* (2006.01)

(52) U.S. Cl.
CPC .......... *G01V 1/201* (2013.01); *G01V 1/3826* (2013.01); *G01V 1/38* (2013.01); *H01R 13/562* (2013.01)

(58) Field of Classification Search
CPC ....... G01V 1/38; G01V 1/201; G01V 1/3808
USPC .................. 367/20, 154; 439/448; 174/101.5
See application file for complete search history.

(56) References Cited

U.S. PATENT DOCUMENTS

| | | | | |
|---|---|---|---|---|
| 4,450,543 A | * | 5/1984 | Neeley .................. | 367/154 |
| 4,469,392 A | * | 9/1984 | Edgerton et al. ........ | 439/190 |
| 4,500,980 A | * | 2/1985 | Copeland ................ | 367/154 |
| 4,526,430 A | * | 7/1985 | Williams ................ | 439/152 |
| 5,683,115 A | * | 11/1997 | Hill ........................ | 285/2 |
| 6,139,354 A | * | 10/2000 | Broussard ............... | 439/447 |

* cited by examiner

*Primary Examiner* — Ian J Lobo
(74) *Attorney, Agent, or Firm* — Kevin Huzen

(57) ABSTRACT

Streamers used in mapping strata beneath a marine body are described, such as in a flexible neutrally buoyant towed array. A connector is used to longitudinally join a first and second streamer section and/or to connect a streamer section to a streamer stabilizer. The connector contains at least one of: (1) means for distributing axial stress over a larger volume or along a longer x-axis length of the streamer relative to the absence of the means for distributing; (2) forming an increasing radius of curvature along the length of the connector as a function of distance from the first leading streamer cable section; and (3) co-moving an inner stress bearing element and an outer wall of the connector preventing intermediate streamer elements, such as a wire bundle from picking up noise related to the movement stress.

20 Claims, 8 Drawing Sheets

US 9,507,041 B2

SOLID STREAMER CONNECTOR APPARATUS AND METHOD OF USE THEREOF

CROSS-REFERENCES TO RELATED APPLICATIONS

This application is:
a continuation-in-part of U.S. patent application Ser. No. 13/295,356 filed Nov. 14, 2011, which claims the benefit of U.S. provisional patent application No. 61/427,775 filed Dec. 28, 2010;
a continuation-in-part of U.S. patent application Ser. No. 13/295,380 filed Nov. 14, 2011;
a continuation-in-part of U.S. patent application Ser. No. 13/295,402 filed Nov. 14, 2011;
a continuation-in-part of U.S. patent application Ser. No. 13/337,091 filed Dec. 24, 2011, and
claims the benefit of U.S. provisional patent application No. 61/638,863 filed Apr. 26, 2012,
all of which are incorporated herein in their entirety by this reference thereto.

TECHNICAL FIELD OF THE INVENTION

The present invention relates to use of sensors to map strata beneath a body of water and/or to sense an object in water.

DESCRIPTION OF THE RELATED ART

Towed arrays of hydrophone sensors are used to map strata beneath large bodies of water, such as gulfs, straights, and oceans.

Patents related to the current invention are summarized herein.

Streamer Cable

R. Pearce, "Non-Liquid Filled Streamer Cable with a Novel Hydrophone", U.S. Pat. No. 5,883,857 (Mar. 16, 1999) describes a streamer cable including a plurality of serially coupled active cable sections having hydrophones located within an outer jacket and a longitudinally and centrally located electro-mechanical cable.

R. Pearce, "Non-Liquid Filled Streamer Cable with a Novel Hydrophone", U.S. Pat. No. 6,108,267 (Aug. 22, 2000) describes a towed array having a central strain member, an inner protective jacket about the strain member, a foam material about the inner protective jacket, and a potting material bonded to the inner protective jacket inside an outer protective jacket.

R. Pearce, "Method and Apparatus for a Non-Oil-Filled Towed Array with a Novel Hydrophone and Uniform Buoyancy Technique", U.S. Pat. No. 6,498,769 B1 (Dec. 24, 2002) describes a towed array having uniform buoyancy achieved using hollow microspheres in a polyurethane matrix, where the percentage of hollow microspheres is correlated with adjacent density of elements of the towed array.

R. Pearce, "Acoustic Sensor Array", U.S. Pat. No. 6,614,723 B2 (Sep. 2, 2003) describes an acoustic sensor array having buoyant sections formed using reaction injection molding with controlled and varying amounts of hollow microspheres and polyurethane as a function of position on the array.

Sensor

R. Pearce, "Acoustic Transducer", U.S. Pat. No. 5,357,486 (Oct. 18, 1994) describes a piezoelectric film strip wrapped around a mandrel having stand off collars on each end. Variations in hydrodynamic pressure flex the film strip in tension to generate a voltage.

R. Pearce, "Acoustic Sensor", U.S. Pat. No. 5,361,240 (Nov. 1, 1994) describes an acoustic sensor having a hollow mandrel with an outer surface defining a concavity and a flexible piezoelectric film wrapped about the outer surface forming a volume between the film and the mandrel, the volume serving as a pressure compensating chamber.

R. Pearce, "Acoustic Sensor and Array Thereof", U.S. Pat. No. 5,774,423 (Jun. 30, 1998) describes an acoustic sensor having electrically coupled piezoelectric materials.

R. Pearce, "Acoustic Sensor and Array Thereof", U.S. Pat. No. 5,982,708 (Nov. 9, 1999) describes an acoustic sensor having a substrate with a concavity on an outer surface that is sealingly enclosed by an active member of a piezoelectric material.

R. Pearce, "Acoustic Sensor and Array Thereof", U.S. Pat. No. 6,108,274 (Aug. 22, 2000) describes an acoustic sensor having a mandrel, a first substrate on an outer surface of the mandrel, a damping layer between the first substrate and a second substrate, a piezoelectric sensor mounted to the second substrate, and an encapsulating material on the piezoelectric material.

R. Pearce, "Method and Apparatus for a Non-Oil-Filled Towed Array with a Novel Hydrophone and Uniform Buoyancy Technique", U.S. Pat. No. 6,819,631 B2 (Nov. 16, 2004) describes a towable hydrophone having a diaphragm with a tubular shape, a thin film piezoelectric element attached to the diaphragm, the diaphragm having a back plane having a cylindrical shape, and at least one longitudinal rib on the exterior of the back plane, where the back plane and exterior rib slidingly engage the tubular diaphragm.

Problem Statement

What is needed is one or more sensors for use in mapping strata under a water body having increased insensitivity to noise sources.

SUMMARY OF THE INVENTION

The invention comprises a seismic streamer connector apparatus and method of use thereof.

BRIEF DESCRIPTION OF THE DRAWINGS

A more complete understanding of the present invention is derived by referring to the detailed description and claims when considered in connection with the Figures, wherein like reference numbers refer to similar items throughout the Figures.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE PREFERRED EMBODIMENTS

The invention comprises a seismic streamer connector apparatus and method of use thereof.

In one embodiment, a connector is used to relieve forces resultant at and/or near a junction of a first seismic streamer section and a second seismic streamer section.

For example, streamers used in mapping strata beneath a marine body are described, such as in a flexible neutrally buoyant towed array, where a connector is used to longitudinally join a first and second streamer section. The connector contains at least one of: (1) means for distributing axial stress over a larger volume or along a longer x-axis length of the streamer relative to the absence of the means for distributing; (2) forming an increasing radius of curvature along the length of the connector as a function of distance from the first leading streamer cable section; and (3) co-moving an inner stress bearing element and an outer wall of the connector allowing intermediate streamer elements, such as a wire bundle from picking up noise related to the movement stress.

In another embodiment, a connector is used to relieve forces resultant at and/or near a junction of a seismic streamer positioner and a seismic streamer section. Herein, the seismic streamer positioner is used for control and/or positive control of one or more of: lateral position of a streamer position, vertical control of a streamer position, roll control of a streamer position, orientation of a streamer cable, depth of a streamer cable, and/or separation of two or more streamer cables in a streamer array.

In yet another embodiment, a set of sensors are embedded within at least two seismic streamer sections. A connector or junction couples a first seismic streamer section with a second seismic streamer section in a manner reducing motion induced noise in the sensor output. Optionally, at least one of the solid streamer sections includes a flexible syntactic elastomer based solid seismic streamer circumferentially encasing a rigid mandrel upon which a sensor element is mounted. The system is used for enhanced data acquisition in marine seismic surveys and passive acquisition.

Axes

Figure 1:
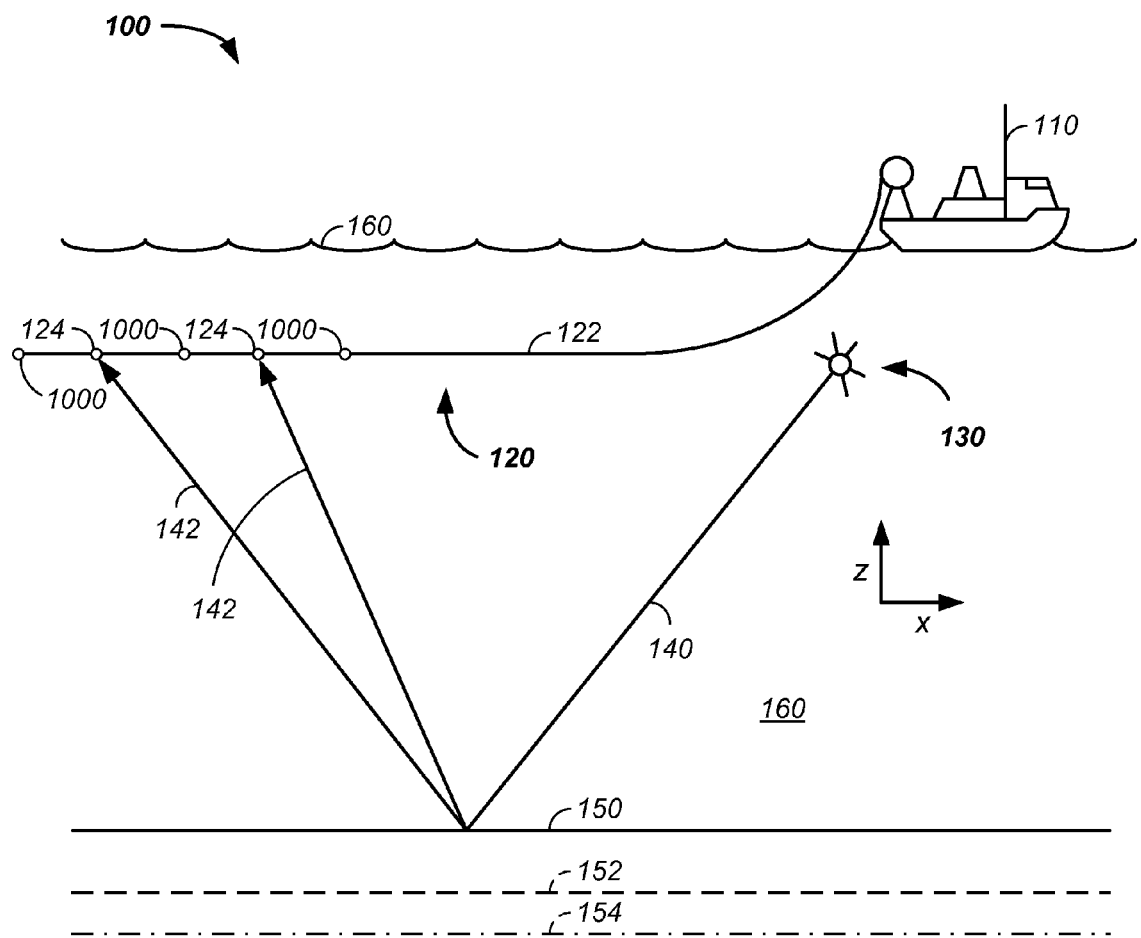
FIG. 1 illustrates a towed sensor array.

Referring now to FIG. 1, herein an x-axis is in a horizontal direction of towing of a sensor array. The x/y axes form a plane parallel to a water body surface. The z-axis is aligned with gravity. Typically, the thickness of a piezoelectric film is viewed in terms of a z-axis, though the piezoelectric film is optionally rolled about a mandrel, described infra.

Streamer Section

In this section, elements of a streamer section of the streamer cable 122 are further described.

Piezoelectric Material

Piezoelectricity is charge that accumulates in certain solid materials in response to applied mechanical stress. A piezoelectric material generates electricity from applied pressure.

An example of a piezoelectric material is polyvinylidene fluoride (PVDF). Unlike ceramics, where the crystal structure of the material creates the piezoelectric effect, in the PVDF polymer intertwined long-chain molecules attract and repel each other when an electric field is applied.

The polyvinylidene material is particularly useful in aqueous environments as the acoustic impedance of PVDF is similar to that of water. An external mechanical force applied to a film of polyvinylidene fluoride results in a compressive or tensile force strain. A film of PVDF develops an open circuit voltage, or electrical charge, which is proportional to the changes in the mechanical stress or strain. By convention, the polarization axis is the thickness axis of the polyvinylidene material. Tensile stress may take place along either the longitudinal axis or the width axis.

Herein, for clarity, polyvinylidene fluoride is used as an example of the piezoelectric material. However, any material that generates a charge in response to pressure is optionally used. Examples include: man-made crystals, such as gallium orthophosphate, a quartz analogic crystal, and langasite; man-made ceramics, such as a titanate, a niobate, a tantalate, or a tungstate; and/or a substantially lead-free piezoceramic.

A PVDF material is characterized in terms of a strip of PVDF film. The PVDF film includes a width axis or x-x axis, a length axis or y-y axis, and a thickness axis or z-z axis. The PVDF film x-x axis is less sensitive, in terms of developed charge, to applied forces than the length axis or the thickness axis of the PVDF film. Hence, in the sensors described herein, the width axis of the PVDF film is typically about parallel to the towing direction of the sensor array to minimize noise signals resultant from towing of the sensor array with a cable under varying strain. Expansion of the y-y axis of the PVDF film is optionally restrained in a mounting step, which results in increased thickness changes of the PVDF film resultant from applied forces. The increased thickness change as a function of applied force is equivalent to an increased signal-to-noise ratio.

The PVDF film is optionally cut, shaped, or wrapped about a surface, such as a mandrel or hollow tube.

A PVDF sensor is a PVDF film coupled with at least one charge transfer element, such as a conductive wire. For example, a PVDF sensor includes a PVDF film coated on both sides with a conductive ink. The conductive ink of the PVDF sensor is electrically attached to electrical lead lines running longitudinally through the streamer cable 122.

Conditioning Electronics

Electric output from the a sensor is carried along a conductive element, such as a wire, one or more electrical lead lines, and/or a wire bundle 250 to an electrical circuit. The electrical circuit optionally includes: a current to voltage converter, such as a preamplifier, an amplifier, processing electronics, an analog-to-digital converter, and/or a data buss. Signal from a first PVDF sensor is optionally:

- combined with signal from a second PVDF sensor using the on-board electrical circuit; and/or
- is post processed after communication of the gathered signal to a processing center.

Towed Sensor Array

Still referring to FIG. 1, a system for mapping strata 100 under a floor 150 of a water body 160 is illustrated. In the illustrated example, a ship 110 tows one or more sensor arrays 120. A sensor array 120 includes at least a streamer cable 122 and a sensor 124.

The streamer cable 122 includes:

- a strain member, such as a central strain member or mandrel;

a wire bundle 250 configured to carry power and/or data, the wire bundle is preferably wrapped about the strain member to reduce strain from towing;

a plurality of sensors 124, such as about equispaced or not equally spaced hydrophones, non-acoustic sensors, and/or accelerometers;

electronics;

a buoyancy element; and/or a protective jacket about the sensors, strain member, and wire bundle.

Elements of the streamer cable 122 are further described, infra.

In use, a seismic shock wave is generated, such as with an explosive 130. For clarity of presentation, a single shock wave 140 from the explosive 130 is illustrated. The shock wave 140 partially reflects from a floor 150 of the water body, and/or from a series of strata layers 152, 154 under the water body floor 150. Again for clarity, only a subset of the surface and strata reflections are illustrated. In one case, the surface reflections yield a vertically rising seismic wave 142 that strikes the one or more sensors 124. In a second case, a seismic wave at least partially reflects off of a water body surface 160 to yield a vertically descending seismic wave, which strikes the one or more sensors 124. The vertically descending seismic wave is an interference signal, which reduces the bandwidth and associated signal-to-noise ratio of the sensors 124.

Still referring to FIG. 1, those skilled in the art know that a matrix of sensors may be used to map strata layers, where the matrix of sensors each detect a plurality of seismic waves, each of the seismic waves reflected off of a plurality of strata layers at a plurality of spatial positions as a function of time.

Sensors

The sensors 124 are further described. Any of the sensors 124 described herein are optionally coated with a flexible solid material as part of the streamer 122. Further, sensors 124 are optionally positioned at any x-axis position of the streamer 122 to form the sensor array 120, though equispacing of like sensor elements 124 is preferred.

Motion Sensor

The sensors 124 optionally include one or more motion sensors, such as described in U.S. patent application Ser. No. 13/295,356, which is incorporated herein in its entirety by this reference thereto. The motion sensor optionally includes:

a substrate;

a piezoelectric motion film optionally attached to a diaphragm; and a hollow cavity, hollow chamber, and/or an enclosed chamber between the substrate and the piezoelectric motion film.

In practice, the substrate is optionally a hollow tube or a hollow mandrel. The substrate is sufficiently rigid to isolate internally radiated stresses from the embodied piezo elements in both the motion sensor and the acoustic sensor. The substrate optionally includes a concave inner surface, defining an inner wall of a tube. The tube is optionally used to contain and/or to constrain movement of centrally placed elements, such as a strain member of the streamer cable, the wire bundle configured to carry power and/or data, a shock absorbing element, and/or the electronics. The substrate also optionally includes a convex outer surface upon which the sensor elements are mounted. Similarly, the sensor is optionally positioned between the inner mandrel and within the sensor housing Acoustic Sensor Further, the sensors 124 optionally include one or more acoustic sensors, such as described in U.S. patent application Ser. No. 13/295,380, which is incorporated herein in its entirety by this reference thereto.

In one example the acoustic sensor uses a rigid strain member or mandrel. However, the mandrel is optionally any rigid surface, such as a hollow cylinder or tube about the motion sensor. A piezoelectric acoustic film is wrapped about the mandrel. The piezoelectric acoustic film includes a conductive material on both the outer surface and the inner surface. For example, a first electrical connector is connected to a first flexible conductive ink circuit on the outer surface of the piezoelectric acoustic film. Similarly, a second electrical connector is connected to a second flexible conductive ink circuit on the inner surface of the piezoelectric acoustic film. The first and second electrical conductors electrically connect to the wires or wire bundle 250 running through the streamer. The outer surface of the piezoelectric acoustic film is optionally coated or contained within a flexible solid.

In practice, an acoustic pressure wave 140 is converted to a mechanical motion at the water/flexible solid interface of the sensor 124. The mechanical motion is transferred to the piezoelectric acoustic film, where a change in shape of the piezoelectric acoustic film is picked up as a corresponding electrical signal using the first electrical connector connected to the first flexible conductive ink circuit on the outer surface of the piezoelectric acoustic film and the second flexible conductive ink circuit on the inner surface of the piezoelectric acoustic film. The electrical signal is amplified and processed, as described supra, to yield information on the floor 150 of the water body and on the series of strata layers 152, 154 under the water body floor 150.

Noise Cancelling Sensor

Still further, the sensors 124 optionally include one or more nose cancelling sensors, such as described in U.S. patent application Ser. No. 13/337,091, which is incorporated herein in its entirety by this reference thereto.

Multiple Sensors

Multiple sensors types are optionally used in each sensor section of the sensor array. For example, output from one or more motion sensor is combined with output from one or more acoustic sensor, output from a first motion sensor is combined with output from a second motion sensor, output from a first acoustic sensor is combined with output from a second acoustic sensor, and/or a noise-cancelling sensor is used with a motion and/or acoustic sensor. The process of combining the signals optionally occurs passively, in a pre-processing stage by use of electronic circuitry, and/or in a post-processing digital signal processing process. An example of multiple sensors is described in U.S. patent application Ser. No. 13/295,402, which is incorporated herein in its entirety by this reference thereto.

Stacked Sensors

Optionally, two or more sensors 120 and/or two or more sensor types are stacked along the y- and z-axes at a given point or length along the x-axis of the streamer cable 122. Generally, a sensor accelerometer, a non-acoustic sensor, and/or an offset acoustic sensor are optionally positioned in any spatial position relative to each other. For example:

the offset acoustic sensor is optionally positioned radially outward from the non-acoustic sensor;

the non-acoustic sensor is optionally at a first radial distance away from the streamer cable 122 that is different than one or both of a second radial distance between the streamer cable 122 and the acoustic sensor or a third radial distance between the streamer cable and the sensor accelerometer; and/or the sensor accelerometer, the non-acoustic sensor, and the offset acoustic sensor are vertically stacked.

Stacking of at least two of the sensors reduces the stiff length section(s) of the sensor array 120, which aids in durability and deployment of the sensor array 120.

A means of connecting the electrodes of the film is provided to which wires are attached to a means by which the signal can be passed through an end of the assembly. The wires combine to form elements of the wire bundle 250, which runs longitudinally through the streamer cable 122.

Each individual sensor embodiment is then over molded within one or more layers with the outer layer forming an over molding using an elastomeric flexible syntactic flotation material.

Signal Wires

Output from the one or more sensors is run through signal wires along at least partial lengths of the streamer cable in the wire bundle 250.

Buoyancy Element

The outer member of the streamer optionally includes incompressible glass spheres used for buoyancy control. For example, the central elements, such as any of the sensor elements described herein, are encased in an outer element, such as a buoyancy element. The buoyancy element:

is optionally used with any sensor 124 herein;

optionally contains non-compressible glass spheres; and/or contains varying amounts of the glass spheres to adjust buoyancy as a function of x-axis position and/or as a function of streamer element size and density.

In any of the sensors described herein, any of the layers, such as an outer buoyancy element are optionally configured with glass spheres, which function as a buoyancy element. Generally, the glass spheres are incompressible up to about two thousand pounds per square inch. Glass spheres are useful in maintenance of uniform buoyancy regardless of the depth at which the streamer 120 is towed. A preferred glass sphere has a density of about 0.32 $g/cm^3$; however the glass spheres optionally have a density of less than water and/or less than about 0.9, 0.8, 0.7, 0.6, 0.5, 0.4, 0.3, or 0.2 $g/cm^3$.

Streamer Section

Completed sensor pairs are then arranged into a group of sensors that forms the acoustic and motion sensor apertures of the seismic streamer section.

The acoustic sensors are typically combined electrically in parallel by use of a twisted pair of conductors connected from one sensor to the next with sufficient length so as to allow for the helix of the wire around the core cable between sensors to prevent breakage when the streamer is bent either in handling or in winding on a reel.

The motion sensors are typically combined electrically in parallel by use of a second twisted pair of conductors connected from one sensor to the next with sufficient length so as to allow for the helix of the wire between sensors to prevent breakage when the streamer is bent either in handling or in winding on a reel.

A completed inner and outer molded sensor section is then over molded with a second form of glass spheres or glass microspheres loaded into an incompressible elastomeric flotation compound that creates a uniform diameter continuous flexible sensor section.

Optional and exemplary relationships between sensor 124 components are further described:

The rigid mandrel or substrate 210 forms the base of the sensor construction.

The electrical wires from each respective sensor are attached together either in parallel or series to create a group of sensors that comprise a discreet channel within the seismic streamer 122.

The group of sensors are placed on the core cable by sliding the cable through the inner diameter of the sensor embodiment.

Each section of the cable is then presented to the process of over molding of the syntactic flotation material which completes the process of construction of the dual sensor seismic section with passive flow noise cancelling.

Electrical connection is made to the piezoelectric film by crimps that puncture the piezoelectric film and provide a conductive path to which wires are then attached to transmit the desired signal, which is a common practice in terminating piezopolymer films.

Streamer Cable Connector

In one embodiment, elements combining two or more streamer sections of the streamer cable 122 are further described herein.

Generally, a connector is used to longitudinally join two streamer sections. The connector optionally contains an interior rigid element. The connector contains at least one of: (1) means for distributing stress over a larger volume or along a longer x-axis length of the streamer relative to the absence of the means for distributing; (2) forming an increasing radius of curvature along the length of the connector as a function of distance from a leading streamer cable section; and (3) co-moving an inner stress bearing element and an outer wall of the connector allowing intermediate elements, such as a wire bundle from picking up noise related to the movement stress.

Figure 2A:
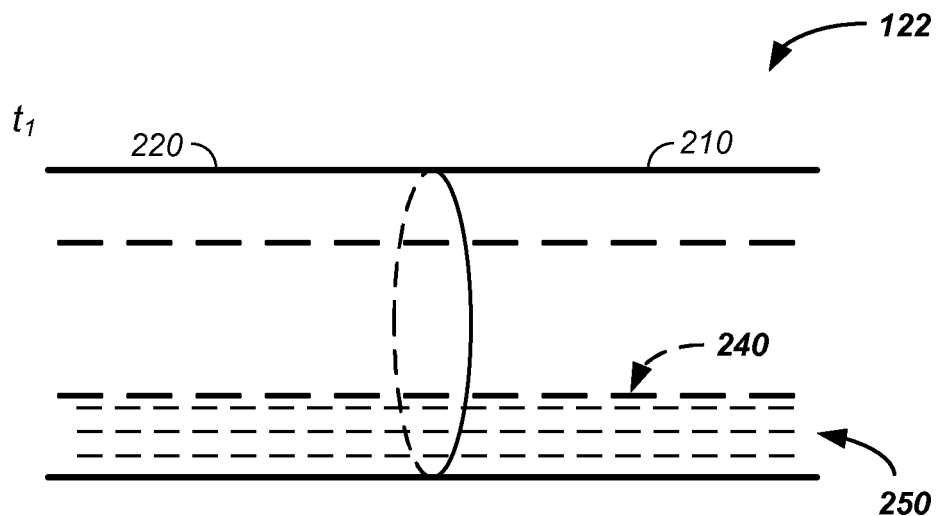
FIGS. 2A and 2B illustrate a first and second seismic streamer section in an aligned and bent orientation, respectively.
Figure 2B:
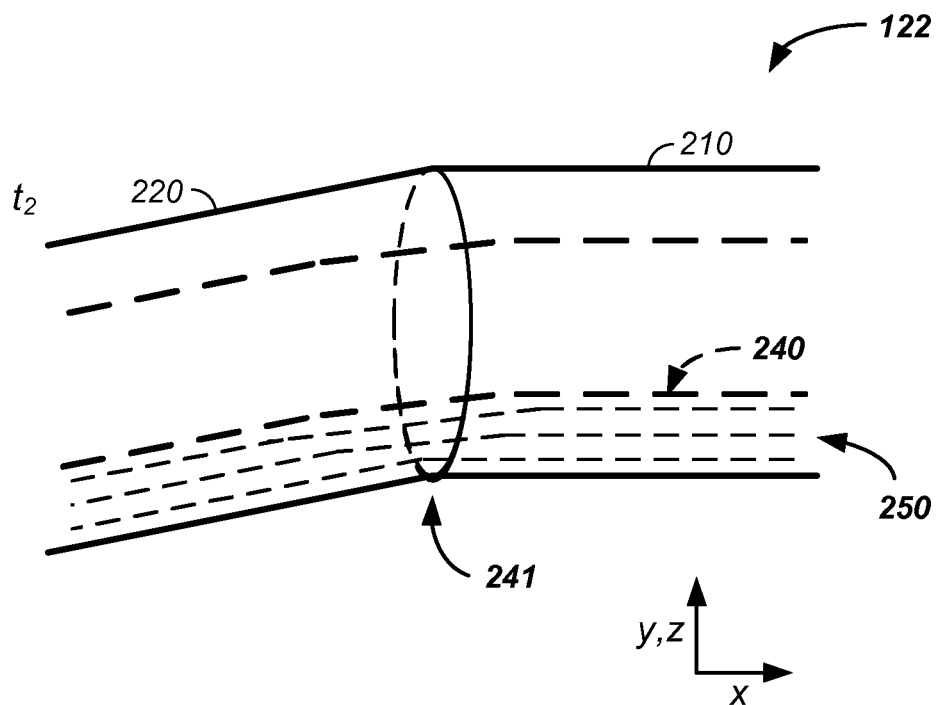

Referring now to FIG. 2A and FIG. 2B, a streamer cable 122 is illustrated with a first streamer section 210 joined at a terminal end to a first end of a second streamer section 220. Both a hollow rigid mandrel 240 and a wire bundle 250 extend longitudinally through the streamer cable 122. Referring now to FIG. 2A, at a first time, $t_1$, a junction between the first streamer section 210 and the second streamer section 220 of the streamer cable 122 is aligned and no stress is placed onto the wire bundle 250 at the junction. Referring now to FIG. 2B, at a second time, $t_2$, the junction between the first streamer section 210 and the second streamer section 220 of the streamer cable 122 is bent, such as about 2, 4, 6, 8, 10, 15, or 20 degrees, and stress is placed onto the wire bundle 250 at the junction in the compressed volume 241 between the rigid mandrel and an outer surface of the streamer cable 122. The stress on the wire bundle 250 in the compressed volume 241 may result in undesirable added noise in signals carried by the wire bundle 250.

Figure 3A:
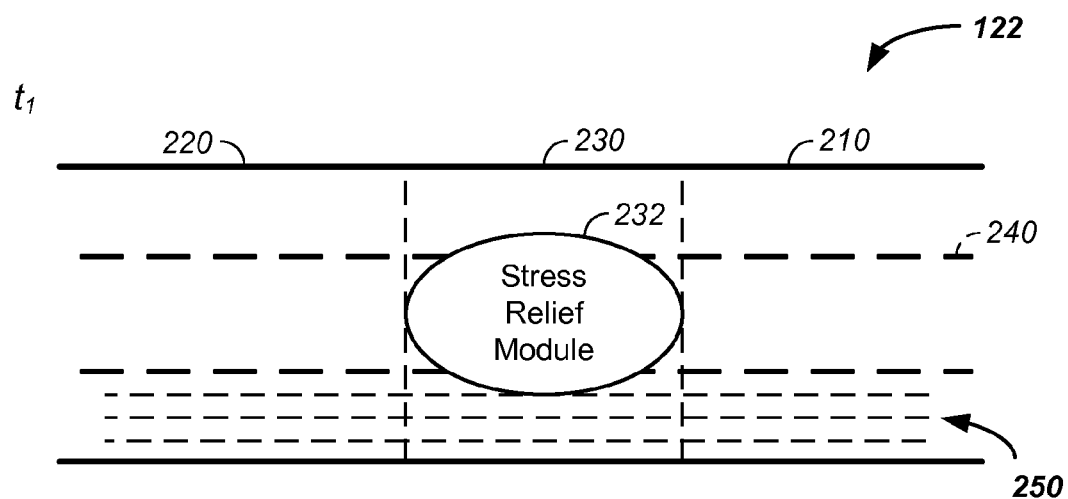
FIGS. 3A and 3B illustrate a first and second seismic streamer section joined by a connector having a stress relief module in an aligned and bent orientation, respectively.
Figure 3B:
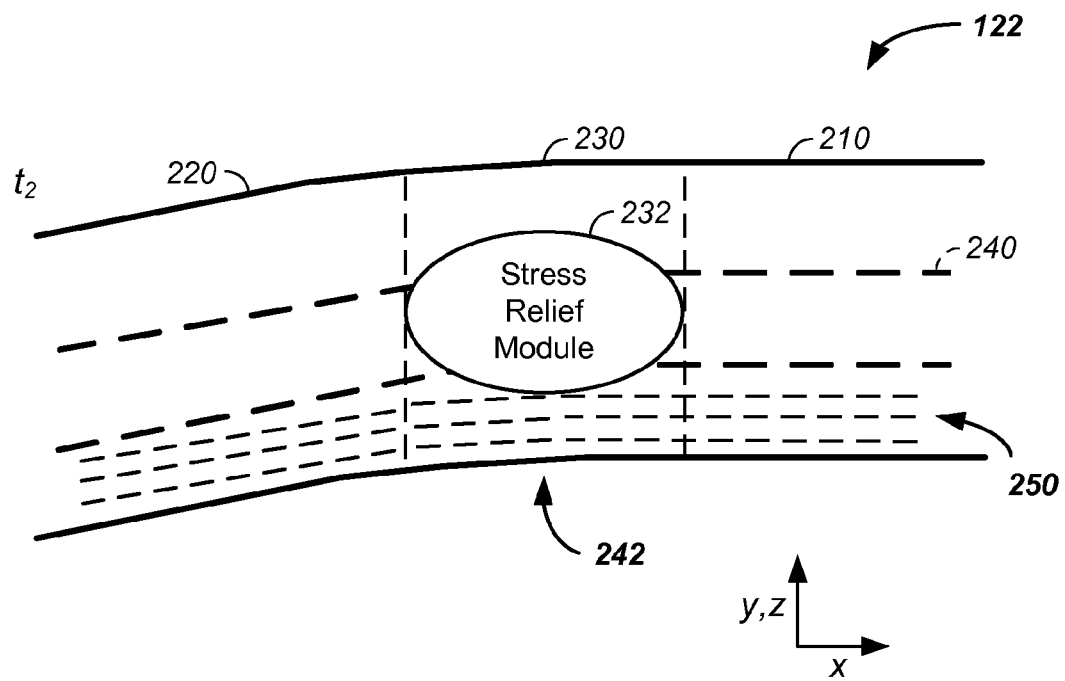

Referring now to FIG. 3A and FIG. 3B, a streamer cable 122 is illustrated with a connector 230 between a terminal end of the first streamer section 210 and the first end of the second streamer section 220. The streamer cable is illustrated in an aligned configuration at a first time, $t_1$, and in a bent configuration at a second time, $t_2$. The connector optionally and preferably contains a stress relief module 232. The stress relief module 232 reduces and/or eliminates added noise in the wire bundle 250 when the alignment of the second streamer section 220 is bent relative to the first streamer section 210 due to a reduced compression volume 242 about the wire bundle 250 between the hollow mandrel 240 and the out surface of the streamer cable 122 in the connector 230. For example, when the second streamer section 220 of the towed array 120 bends relative to the first streamer section 210 along the y- and/or z-axes, the stress relief module distributes the resultant stress over a longer section, such as less than 1, 2, 3, 5, 10, 15, 20, 30, or 50 inches, of the streamer cable 122 resulting in less compression per unit volume and/or longitudinal x-axis in the reduced compression volume 242. The distributed compression reduces and/or eliminates noise picked up in the wire bundle 250 resultant from bending of the second streamer section 220 relative to the first streamer section 210.

Figure 4:
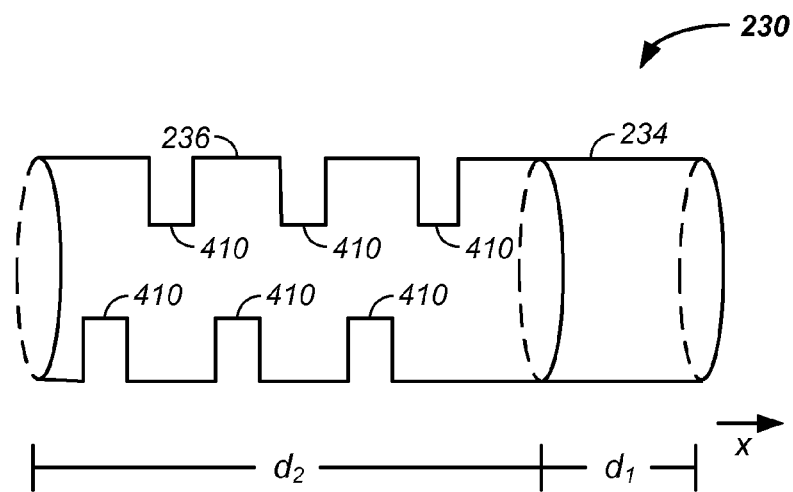
FIG. 4 illustrates a connector having a rigid attaching section and a flexible section.

Referring now to FIG. 4, a stress reduction joiner or connector 230 is illustrated. In use, the stress reduction joiner is used to longitudinally join the first streamer section 210 to a second streamer section 220. In this example, the connector includes at least two sections. A first connector section 234 is optionally rigid and is used to connect to the terminal end of the first streamer section 210. A second connector section 236 of the connector 230 is optionally flexible along the y- and/or z-axes and connects at a first end to the first connector section 234 and connects at a second end to the second connector section 236. Optionally, the first connector section 234 is integrated with the second connected section 236. Herein, the flexible second connector section 236 bends along the x-axis by less than about 2, 4, 6, 8, 10, 15, or 20 degrees and/or is flexible relative to the rigid first connector section 234. Optionally, the first connector section 234 has a first x-axis length, $d_1$, and the second connector section 236 has a second x-axis length, $d_2$. Optionally, the first x-axis length, $d_1$, is shorter than the second x-axis length, $d_2$, such as about 10, 20, 30, 40, 50, 60, 70, or 80 percent of the second x-axis length. Optionally, the second connector section 236 is used in the absence of the first connector section 234. Generally, the resistance of the connector 230 to one or more y- and/or z-axes stresses is constant as a function or x-axis position or more preferably decreases as a function of x-axis distance away from the first streamer section 210. Generally, any of the elements described herein are usable with and/or are integrated into any of the connectors 230 described herein. Further, additional connectors are used to connect additional streamer sections to the streamer cable 122 and still additional connectors are used in separate streamer cables of the towed array 120.

Still referring to FIG. 4, a first example of flexing means in the connector 230 or second connector section 236 is illustrated. In this example, the second connector section 236 includes an outer wall with divots, cuts, grooves, and/or channels 410 cut into the outer wall. For clarity of presentation, the divots, cuts, and/or grooves are referred to herein as channels 410. The channels interrupt the longitudinal integrity of the outer wall of the second connector section 236, which allows the second connector section 236 to bend along the y- and/or z-axes in response to stress of misalignment of the first streamer section 210 relative to the second streamer section 220. Optionally, the channels 410 run along any combination of the x-, y-, and z-axes. Preferably, the channels run circumferentially around the second connector section 236 at a given x-axis position. The width and/or depth of the channels 410 is optionally a function of x-axis position in the connector 230. For example, the widths and/or depths of the channels 410 optionally increase with increased distance from the terminal end of the first streamer section 210, which yields greater resistance to axial stresses at the first end of the connector 230 and less resistance to axial stresses at the second end of the connector 230.

Figure 5:
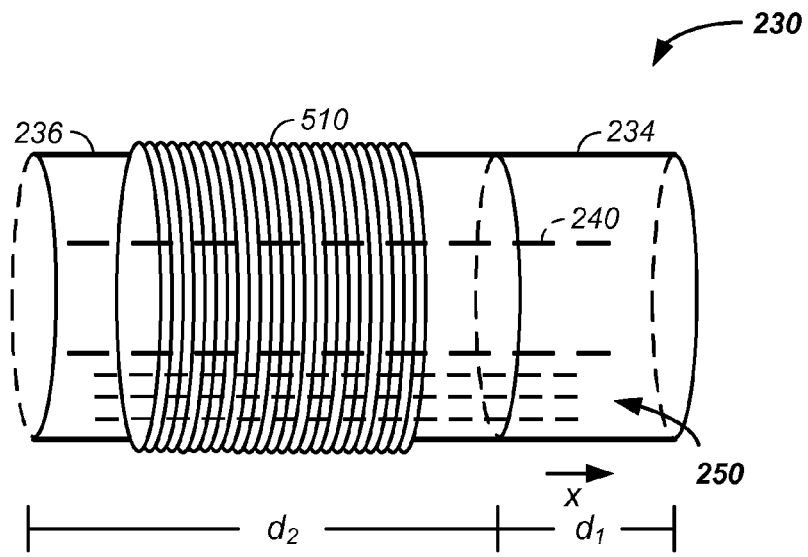
FIG. 5 illustrates a spring used to constrain bending of a connector.

Referring now to FIG. 5, a second example of flexing means in the connector 230 or second connector section 236 is illustrated. In this example, the second connector section 236 includes a spring 510. As illustrated, the spring 510 wraps circumferentially about the connector 230. Optionally, the spring 510 is partially embedded into the connector 230 or is circumferentially encased by at least part of the connector 230. The spring is used to lengthen the x-axis length of bend in the connector 230, which reduces and/or eliminates induced noise picked up in the wire bundle 250 as a result of reduced stress and/or pressure over a smaller x-axis length of the connector in the absence of the spring 510. Any of the features of the first connector section 234 and/or second connector section 236, described supra, are optionally used with any connector 230 using a stress relief spring. Optionally, the number of windings of the spring 510 per x-axis unit length is a function of x-axis position on the connector, as described infra.

Figure 6:
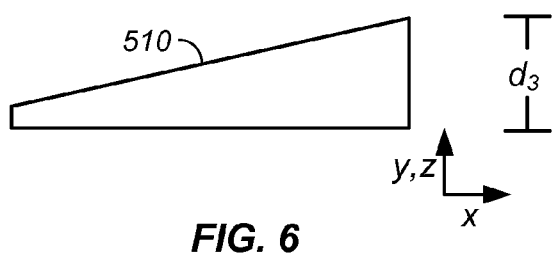
FIG. 6 illustrates a varying cross-sectional thickness of a spring as a function of x-axis location.

Referring now to FIG. 6, a third example of flexing means in the connector 230 or second connector section 236 is illustrated. In this example, the second connector section 236 includes a spring 510 where the diameter or y/z-axes cross-sectional area of the spring 510 is a function of x-axis position. For example, as illustrated in FIG. 6, the thickness, d3, of the spring 510 decreases with increased distance from the first streamer section 210. The decrease in thickness, d3, of the spring 510 with x-axis position is optionally a continuous function and/or a step function. The decreased resistance to y- and/or z-axes stresses as a function of x-axis position from the first streamer section 210 both spreads out pressure on the reduced pressure volume 242 and allows for a greater radius of curvature of the bend in the connector 230 compared to use of a uniform resistance to y- and/or z-axes stresses. For example, a small deflection of the connector 230 occurs at a first x-axis location and progressively and/or geometrically larger deflections of the connector 230 occur at greater distances from the first connector end, which allows radii of curvatures of the bend of the connector 230 to increase with x-axis position relative to the first end of the connector 230 connecting to the first streamer section 210.

Figure 7A:
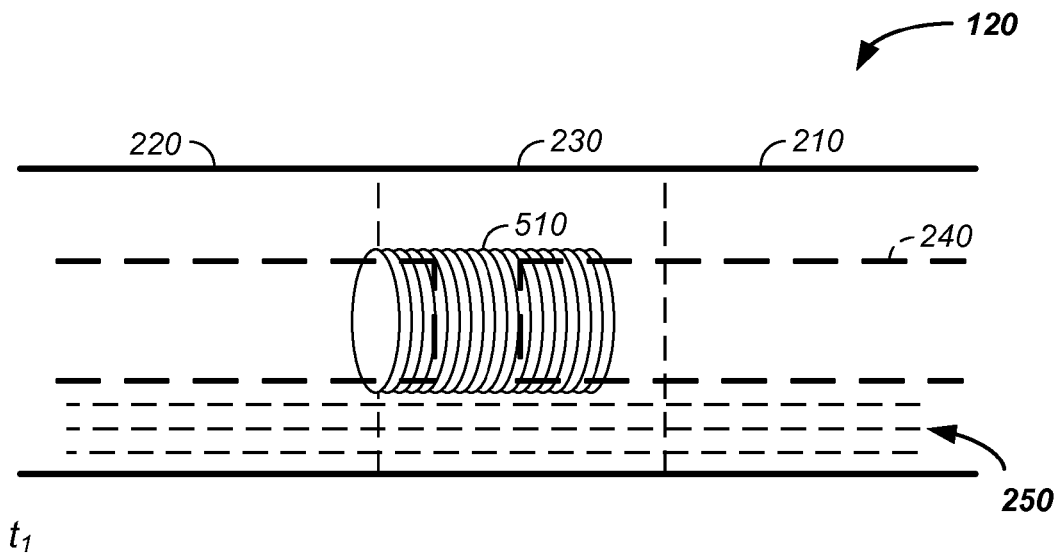
FIGS. 7A and 7B illustrate a spring relief element circumferentially surrounding a portion of a section aligned with a central strain member in an aligned and bent orientation, respectively.
Figure 7B:
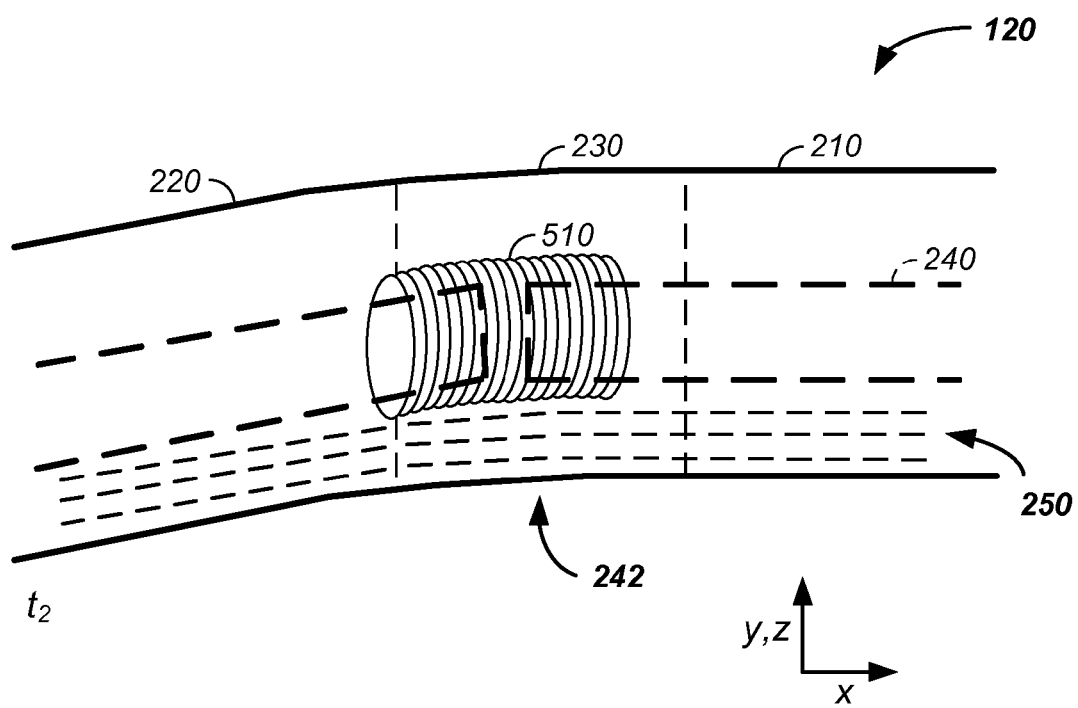

Referring now to FIG. 7A and FIG. 7B, a fourth example of flexing means in the connector 230 or second connector section 236 is illustrated. In this example, the second connector section 236 includes a spring 510 wound or inserted over the hollow mandrel 240 or an extension of the hollow mandrel 240 into the connector 230. For instance, the spring is wound over a cone or tube affixed to one or more elements of the first streamer section 210, such as a tube protruding from and/or affixed to the mandrel 240 of the first streamer section 210. Referring now to FIG. 7A, at a first point in time, $t_1$, the spring 510 is in a relaxed state about the mandrel extension in the connector while the first streamer section 210 and second streamer section 220 are aligned along the x-axis. Referring now to FIG. 7B, at a second point in time, $t_2$, the spring 510 is in a higher y- and/or z-axes energy state relative to the relaxed state. The higher y- and/or z-axes energy state is responsive to y- and/or z-axes stresses resultant on the spring 510 due to bends in second streamer section 220 relative to the first streamer section 210. Here, the spring 510 moves with a rigid, solid or hollow, inner tube of the connector 230. The outer wall of the connector 230 moves with the spring 510 as it deforms with stress. As a result of the co-movement of the stress carrying spring 510 and outer wall of the connector 230, the wire bundle 250 volume in the connector is not compressed with bends in the streamer and compression noise is not induced in the wire bundle 250.

Figure 8:
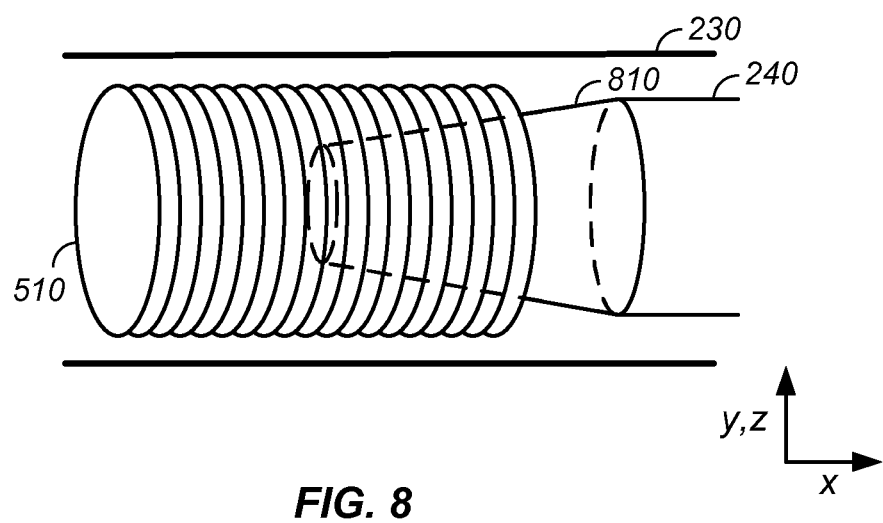
FIG. 8 illustrates a first stress relief element.

Referring now FIG. 8, a fifth example of flexing means in the connector 230 or second connector section 236 is illustrated. In this example, the second connector section 236 includes a spring 510 wound or inserted over an internal rigid connector section 810, which is directly or indirectly affixed to the rigid tube or hollow mandrel of the first streamer section 210. In one parameter, the rigid connector section 810 is longitudinally hollow or is solid. In another parameter, the rigid connector section 810 includes a fixed y-, z-axes cross-sectional area with x-axis position in the connector 230 or has a y-, z-axes cross-sectional area that is a function of x-axis position in the connector 230. As illustrated, the rigid connector section 810 has a cone shape, which allows the spring 510 to deform to a controlled greater degree in the y/z place with increased distance from the first end of the connector 230. Similar to the embodiments described supra, the cone shape allows a set of varying radii of curvatures of the bend of the connector 230 to increase with x-axis position relative to the first end of the connector 230.

Figure 9:
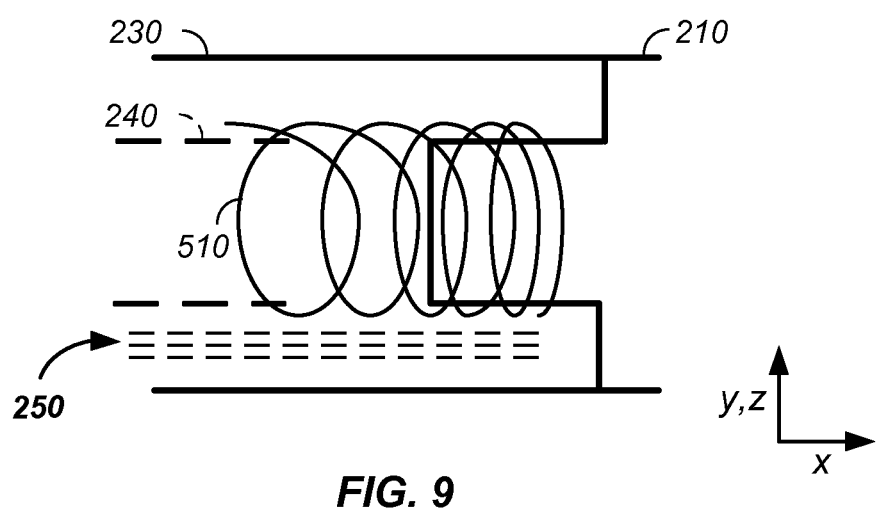
FIG. 9 illustrates a second stress relief element.

Referring now to FIG. 9, a sixth example of flexing means in the connector 230 or second connector section 236 is illustrated. In this example, the second connector section 236 includes a spring 510 wound or inserted over a portion of the hollow mandrel 240 extending out of the first streamer section 210 into the connector 230. In this example, windings of the spring 510 have increased spacing as a function of x-axis position from the first streamer section 210, which allows to spring 510 to progressively increase in y- and/or z-axes deflection in a non-linear or exponential fashion as a function of x-axis position in the connector 230. Optionally, the hollow mandrel 240 optionally extends from the second streamer section 220 into the connector 230.

In a seventh example, the flexing means in the connector, such as the spring 510, are embedded in a semi-flexible connector without a central rigid member or hollow mandrel.

Generally, the connector optionally includes: (1) means that co-move an inner stress reducing element and an outer wall of the connector, such that the wire bundle moves in a uniform space or (2) a system or element for distributing stress over a larger volume or longitudinal length of the streamer relative to the absence of the system or element.

Method of Manufacture

An example of method of manufacture is described. To make the streamer cable 122, a rigid mandrel or substrate is fabricated to produce a desired form factor for the final embodiment as a seismic streamer or sensor array 120. The substrate or rigid mandrel is over molded to place the required features onto the surface of the rigid mandrel to allow for the mounting and isolation of discreet sensors.

In varying embodiments, the sensor 124 comprises any of:
  a thin film piezopolymer acoustic sensor incorporating a flexible microsphere loaded transfer adhesive as the compressible gas chamber providing high sensitivity and immunity to overburden pressure;
  a seismic streamer for marine seismic surveys embodying a thin film piezopolymer acoustic sensor incorporating a unique flexible microsphere loaded transfer adhesive as the compressible gas chamber providing high sensitivity and immunity to overburden pressure;
  a thin film piezopolymer acoustic sensor incorporating a flexible microsphere loaded transfer adhesive as the compressible gas chamber providing high sensitivity and immunity to overburden pressure combined with zones of non-microsphere loaded transfer adhesive to act as sensors of the turbulent boundary layer whose combined output provides for passive cancelling of noise due to turbulent boundary layer flow;
  a seismic streamer for marine seismic surveys embodying a thin film piezo polymer acoustic sensor incorporating a unique flexible microsphere loaded transfer adhesive as the compressible gas chamber providing high sensitivity and immunity to overburden pressure combined with zones of non-microsphere loaded transfer adhesive to act as sensors of the turbulent boundary layer whose combined output provides for passive cancelling of noise due to turbulent boundary layer flow;
  a monolithic sensor or multiple sensors housed in a single housing, such as a rigid housing, dual output, flow noise cancelling acoustic and liquid metal uniaxial motion sensor embodied in a flexible elastomer, such as a syntactic elastomer, based solid seismic streamer for marine seismic surveys;
  a seismic streamer for marine seismic surveys embodying a thin film piezo polymer acoustic sensor incorporating a flexible microsphere loaded transfer adhesive as the compressible gas chamber providing high sensitivity and near immunity to overburden pressure combined with zones of non-microsphere loaded transfer adhesive to act as sensors of the turbulent boundary layer whose combined output provides for passive cancelling of noise due to turbulent boundary layer flow;
  a monolithic dual output, acoustic and motion sensor co-located within a single discreet housing;
  a monolithic dual output, acoustic sensor and motion sensor utilizing an acoustic sensor employing a flexible piezopolymer film, such as a syntactic backed piezopolymer film embodiment;
  a monolithic dual output, acoustic and motion sensor utilizing a liquid metal electrode arrangement, which uses gravity to place the fluid mass and electrode in such a manner as to allow for sensing only vertical motion and rejecting undesirable motion;
  a monolithic dual output, acoustic and acceleration sensor utilizing a novel pressure isolation method to prevent acoustic response in the motion sensor response;
  a seismic streamer for marine seismic surveys embodying a thin film piezo polymer acoustic sensor incorporating a flexible microsphere loaded transfer adhesive as the compressible gas chamber providing high sensitivity and immunity to overburden pressure combined with zones of non-microsphere loaded transfer adhesive to act as sensors of the turbulent boundary layer whose combined output provides for passive cancelling of noise due to turbulent boundary layer flow combined with a novel monolithic dual output, acoustic and motion sensor utilizing a novel liquid metal electrode arrangement which uses gravity to place the fluid mass and electrode in such a manner as to allow for sensing only vertical motion and rejecting undesirable motion;
  a monolithic dual output, acoustic and motion sensor embodied within a flexible syntactic seismic streamer in groups that are nested in complex spacing arrangements to enhance rejection of undesirable signals; and
  a monolithic dual output, acoustic and motion sensor embodied within a flexible syntactic seismic streamer allowing for the core electro-mechanical cable to reside within the diameter of the sensor embodiment.

Streamer Positioner/Coupler Connection

In another embodiment, a connector is used to relieve forces resultant at and/or near a junction of a seismic streamer positioner and a seismic streamer section.

Herein, the seismic streamer positioner is also referred to as a depth controller. A depth controller is used to control the depth of tow of the streamer. For example, a depth controller is connected using a pair of collars and races connected directly to the outside diameter of the streamer. In this example, the depth controller is generally tube shaped with a set of fins attached to the aft end and two standoffs where the collars attach it to the streamer at the races, which allowed the bird to rotate around the axis of the streamer making it always hang below the streamer. Essentially, the depth controller controls only the vertical position of the streamer in the water body.

Streamer arrays are often used instead of a single streamer, which allows more accurate and precise three-dimensional maps of underlying strata layers. To enhance performance of the towed array, spacing between individual streamers in the array is preferably controlled. For example, a known and/or controlled distance between any two cables of an array of cables is preferred. The controlled position of each cable is achieved using birds, described infra.

Herein, the seismic streamer positioner is also referred to as a bird, a bird positioner, and/or as a bird controller. A bird or seismic streamer positioner is used for control and/or positive control of one or more of: lateral position of a streamer position, vertical control of a streamer position, roll control of a streamer position, orientation of a streamer cable, depth of a streamer cable, separation of two or more streamer cables in a streamer array, and/or control of a trailing end of one or a set of streamers. Multiple bird positioners are optionally and preferably used for each streamer cable.

Figure 10A:
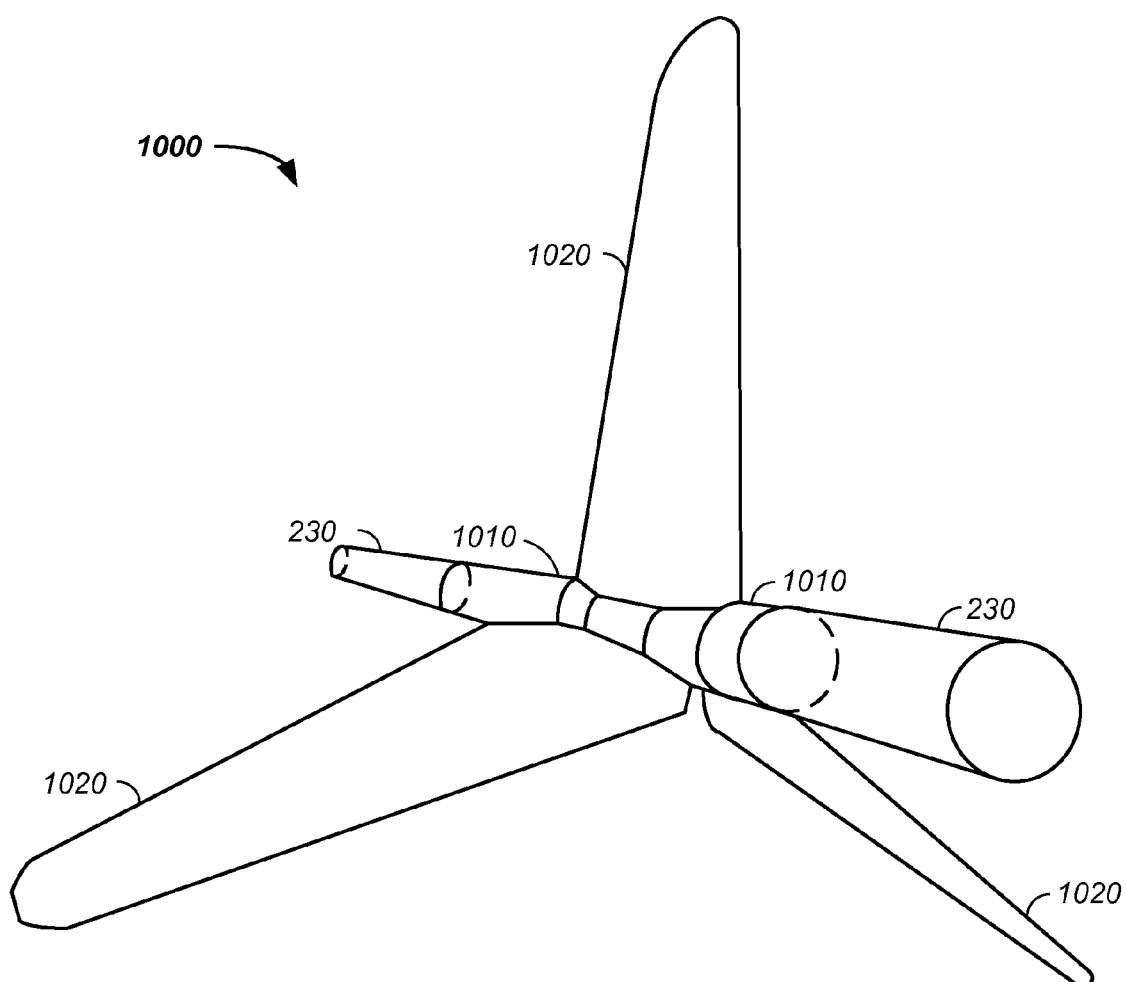
FIGS. 10A, 10B, and 10C illustrate a streamer positioner from a perspective, end, and top view, respectively.
Figure 10B:
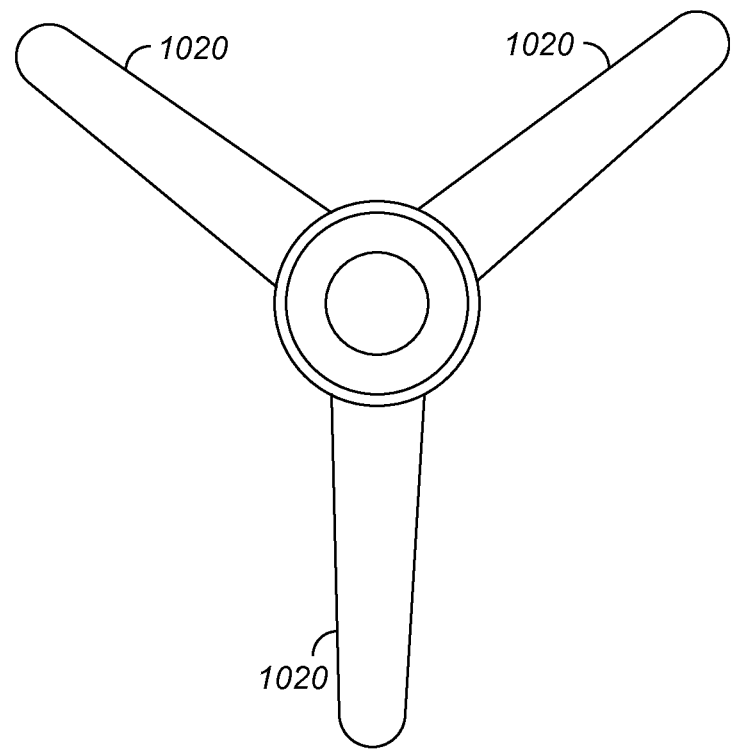
Figure 10C:
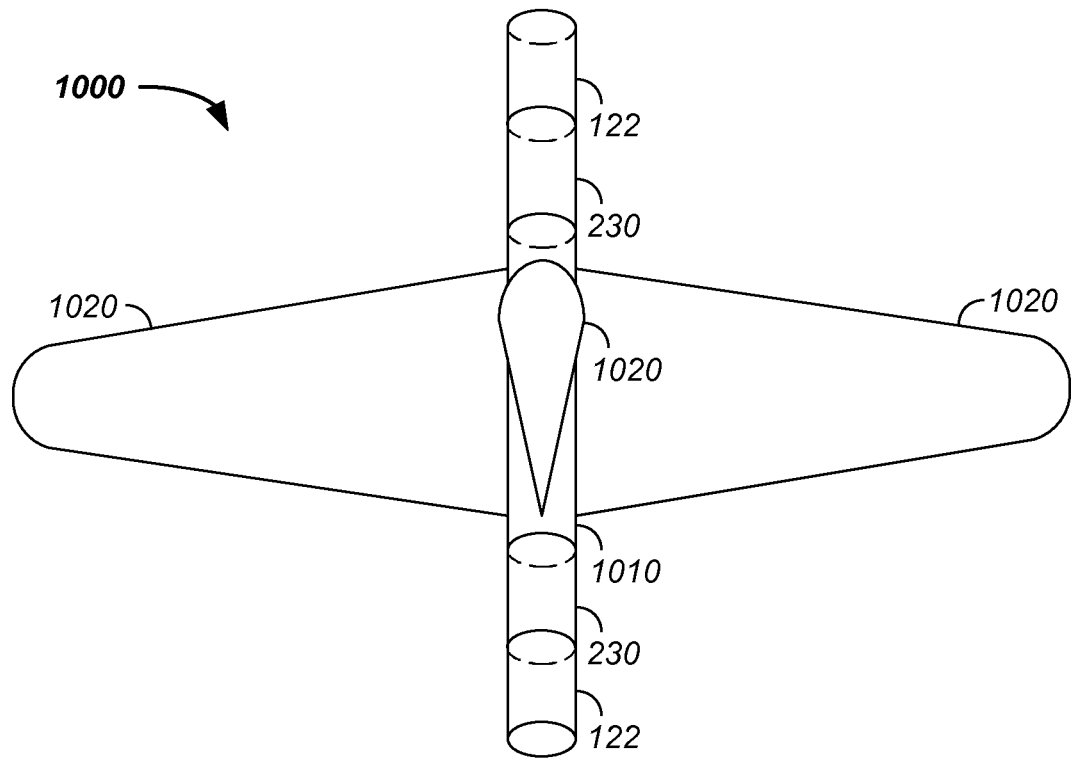

Referring now to FIGS. 10A-C, a perspective, end, and top view, respectively, of a bird positioner 1000 relative to one or more couplers 230 and relative to one or more streamer sections 122 is provided. The bird positioner 1000 includes a central tube shaped member 1010, which is optionally a hollow shaft carrying communication lines. For clarity of presentation, the bird positioner 1000 is illustrated with three fins; however, any number of fins for a given bird positioner are optionally used, such as 2, 3, 4, 5, or more fins. Still referring to FIG. 10A-C, the illustrated bird positioner has three fins at 120 degree intervals around the central member 1010, which is typically a dedicated module that connects between the seismic streamer sections much the same as the digital telemetry modules. The seismic streamer positioner or bird positioner optionally includes: internal inertial guidance, which allows sensor input as to which way is up, internal compasses for determination of direction, and electro and/or mechanical components for control of bearing and azimuth.

The bird positioner is optionally:
constructed of titanium for tensile strength and corrosion resistance;
includes replaceable attached wings to the central tubular member to allow winding on a streamer drum;
contains wireless and/or wired communication elements for long range streamer communication; and/or
contains wireless power transfer between the wing 1020 and the body 1010.

An example of a bird positioner is the eBird® (Kongsberg Maritime, Kongsberg, Norway).

The connector 230, described supra, for connecting a terminal end of the first streamer section 210 and the first end of the second streamer section 220 is optionally used to connect a streamer section 122 to a streamer positioner 1000.

Any of the above described elements of the stress relief module 232 are optionally used in a streamer positioner connector. Further, the orientation along the x-axis of any of the above described connector 230 elements are optionally reversed to face up a length of the streamer cable 122 as opposed to the above described elements facing down the length of the streamer cable 122.

For example, any of the above described connectors are used: (1) to connect at a first end to a streamer cable 122 and at a second end to the streamer positioner 1000 or (2) to connect at the first end to a streamer positioner 1000 and at the second end to a streamer cable 122 section. Similarly, the connector is optionally used at the tail end of a series of streamer sections to connect to a trailing streamer positioner.

In another example, a seismic streamer includes: (1) a leading streamer section having a leading inner rigid element, (2) a trailing streamer section including a trailing inner rigid element, (3) a connector that has a flexible inner element longitudinally connected to the leading inner rigid streamer element and the trailing inner rigid element, (4) a wire bundle outside the leading inner rigid element, the flexible inner element of the first connector, and the trailing inner rigid element, and (5) an outer buoyancy element formed over the flexible inner element of the first connector and the wire bundle, where the wire bundle electrically couples the leading streamer section to the trailing streamer section through the connector.

Herein, a first of two elements, such as a feature, distance, height, width, size, gap, coating, or the like, is optionally at least 1, 2, 5, 10, 20, 50, 100, or 200 percent larger than a second of the two elements. Similarly, a second of two elements is optionally less than $\frac{1}{10}^{th}$, $\frac{1}{5}^{th}$, $\frac{1}{3}^{rd}$, $\frac{1}{2}$, or $\frac{3}{4}$ a size of the first of the two elements.

Still yet another embodiment includes any combination and/or permutation of any of the sensor elements described herein.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. An apparatus, comprising:
a seismic streamer, comprising:
 a leading streamer section comprising a leading inner rigid element;
 a trailing streamer section comprising a trailing inner rigid element;
 a first connector, comprising:
  a flexible inner element;
   said flexible inner element longitudinally connected to said leading inner rigid streamer element,
   said flexible inner element longitudinally connected to said trailing inner rigid element;
  a wire bundle, said wire bundle outside: (1) said leading inner rigid element, (2) said flexible inner element of said first connector, and (3) said trailing inner rigid element; and
  an outer buoyancy element formed over both: said flexible inner element of said first connector and said wire bundle,
  wherein said wire bundle electrically couples said leading streamer section to said trailing streamer section through said first connector, and
  wherein during use an x-axis comprises an axis along a length of said leading streamer section.

2. The apparatus of claim 1, said flexible inner element further comprising:
a spring comprising a coil and a central aperture, said spring wound about at least a portion of said leading inner rigid element.

3. The apparatus of claim 1, wherein said leading inner rigid element of said leading streamer section forms an extension section into said first connector.

4. The apparatus of claim 3, said flexible inner element circumferentially surrounding at least a portion of said extension of said leading streamer section into said first connector.

5. The apparatus of claim 4, said flexible inner element further comprising:

an outer surface, said outer surface comprising a radial stress relief element, said radial stress relief element comprising at least one of:
 a set of divots in said outer surface;
 a set of cuts in said outer surface;
 a set of grooves in said outer surface; and
 a set of channels in said outer surface.

6. The apparatus of claim 5, said set of grooves comprising at least a first groove and a second groove, said first groove comprising a first cross-sectional area radially across said first groove, said second groove comprising a second cross-sectional area radially across said second groove, said second cross-sectional area at least fifty percent larger than said first cross-sectional area.

7. The apparatus of claim 5, wherein said set of channels interrupt longitudinal integrity of said outer surface of said radial stress relief element.

8. The apparatus of claim 4, said flexible inner element comprising a spring circumferentially surrounding at least a portion of said extension, said spring comprising a winding.

9. The apparatus of claim 8, said winding comprising a cross-sectional area, at least a portion of said cross-sectional area decreasing as a function of distance from said leading streamer section.

10. The apparatus of claim 8, said winding comprising a set of turns, wherein a first distance between a first pair of said set of turns is at least twenty percent less than a second distance between a second pair of said set of turns.

11. The apparatus of claim 4, said extension of said leading streamer section into said first connector comprising;
a first cross-sectional area perpendicular to the x-axis; and
a second cross-sectional area perpendicular to the x-axis, said first cross-sectional area at least twenty percent larger than said second cross-sectional area.

12. The apparatus of claim 4, said first connecter further comprising:
a tube, said tube circumferentially surrounding at least a portion of said extension of said leading streamer section into said first connector.

13. The apparatus of claim 1, further comprising:
a second connector comprising:
 a rigid tube, said rigid tube affixed to said leading inner rigid element of said leading streamer section, said first connector affixed to said rigid tube.

14. The apparatus of claim 13, said flexible inner element longitudinally affixed to said rigid tube of said second connector, wherein said rigid tube of said second connector longitudinally separates said leading streamer section from said first connector along the x-axis.

15. The apparatus of claim 13, said flexible inner element of said first connector circumferentially surrounding at least a portion of said rigid tube of said second connector.

16. The apparatus of claim 1, said seismic streamer comprising at least one of:
a first seismic streamer sensor section comprising a sensor configured to sense at least one of motion and noise; and
a first solid seismic positioner section configured to control at least three of:
 lateral position of said seismic streamer;
 vertical position of said seismic streamer;
 roll of said seismic streamer; and
 depth of said seismic streamer.

17. The apparatus of claim 16, said seismic streamer comprising at least one of:
- a second seismic streamer sensor section; and
- a second solid seismic positioner section.

18. The apparatus of claim 16, said sensor comprising:
- a rigid hollow tube comprising a concave inner surface, a convex outer surface, and a channel in said convex outer surface at least partially circumferentially surrounding said rigid hollow tube;
- a piezoelectric motion film circumferentially wrapped over the channel about said rigid hollow tube, the channel comprising a total volume between said rigid hollow tube and said piezoelectric motion film; and
- a conductive liquid in the channel, said conductive liquid contacting both said rigid hollow tube and said piezoelectric motion film.

19. The apparatus of claim 16, said sensor comprising:
- a rigid tube;
- an acoustic piezoelectric sensor, comprising:
    - a flexible film polymer, comprising: an inner film surface and an outer film surface;
    - a first conductive element contacting said outer film surface; and
    - a second conductive element contacting said inner film surface; and
    - a plurality of flexible microspheres both proximate said second conductive element and radially inward of said second conductive element, said acoustic piezoelectric sensor circumferentially wrapped about said hollow rigid tube, wherein said microspheres proximately contact said rigid tube.

20. A method comprising the step of:
towing a seismic streamer, said seismic comprising:
- a leading streamer section comprising a leading inner rigid element;
- a trailing streamer section comprising a trailing inner rigid element;
- a first connector, comprising:
    - a flexible inner element;
        - said flexible inner element longitudinally connected to said leading inner rigid streamer element,
        - said flexible inner element longitudinally connected to said trailing inner rigid element;
- a wire bundle, said wire bundle outside: (1) said leading inner rigid element, (2) said flexible inner element of said first connector, and (3) said trailing inner rigid element; and
- an outer buoyancy element formed over both: said flexible inner element of said first connector and said wire bundle,
- wherein said wire bundle electrically couples said leading streamer section to said trailing streamer section through said first connector, and
- where an x-axis comprises an axis along a length of said leading streamer section.

* * * * *